(12) United States Patent
Loewen et al.

(10) Patent No.: US 10,566,097 B2
(45) Date of Patent: Feb. 18, 2020

(54) INTERMIXING FEEDWATER SPARGER NOZZLES AND METHODS FOR USING THE SAME IN NUCLEAR REACTORS

(71) Applicant: GE-Hitachi Nuclear Energy Americas LLC, Wilmington, NC (US)

(72) Inventors: Eric P. Loewen, Wilmington, NC (US); James P. Sineath, Summerville, SC (US); Dean D. Molinaro, Clearwater, FL (US); William C. Dawn, Stafford, VA (US); Robin D. Sprague, Wilmington, NC (US); Theron D. Marshall, Wilmington, NC (US); Joel P. Melito, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 344 days.

(21) Appl. No.: 15/470,706

(22) Filed: Mar. 27, 2017

(65) Prior Publication Data
US 2018/0277265 A1    Sep. 27, 2018

(51) Int. Cl.
*G21C 15/25* (2006.01)
*F04F 5/10* (2006.01)
(Continued)

(52) U.S. Cl.
CPC ............. *G21C 15/25* (2013.01); *F04F 5/10* (2013.01); *F04F 5/46* (2013.01); *F04F 5/463* (2013.01);
(Continued)

(58) Field of Classification Search
CPC ............. G21C 15/25; F04F 5/46; F04F 5/463
See application file for complete search history.

(56) References Cited

U.S. PATENT DOCUMENTS

| 2,944,623 A | 7/1960 | Bodine |
| 3,134,338 A * | 5/1964 | Dodge ...................... F04F 5/46 417/194 |

(Continued)

FOREIGN PATENT DOCUMENTS

| CN | 2835273 | 8/2006 |
| JP | 2011237455 | 11/2011 |

(Continued)

OTHER PUBLICATIONS

Areva, "The 1250 MWe Boiling Water Reactor," 2010.
(Continued)

*Primary Examiner* — Benjamin M Kurtz
(74) *Attorney, Agent, or Firm* — Ryan Alley IP (57) ABSTRACT

Nozzles mix coolant from different sources together in an outlet to prevent differences in coolant output. Different flow path configurations are useable in the nozzle, including a multiple-path configuration with flows from different sources jacketed or concentrically arranged around flows from other sources. Swirl vanes may be installed in the nozzle to impart mixing or filtering the fluid flow. Diffusers may be used to passively suction or accelerate flow and mixing the same like a jet pump. Nozzles can be combined with filtration systems like trap filters that capture debris based on a momentum difference between the denser debris and fluid. Filters can use magnetic, adhesive, or porous materials to capture debris without blocking a flow path. Filters can be disengaged, such as when clogged, such that coolant flows around the system. Nozzles can be installed on feedwater sparger assemblies in varying manner to distribute coolant from multiple nozzles.

18 Claims, 8 Drawing Sheets

(51) Int. Cl.
　　　*F04F 5/46*　　(2006.01)
　　　*G21C 13/02*　　(2006.01)
　　　*G21C 15/16*　　(2006.01)
　　　*B01F 3/04*　　(2006.01)
(52) U.S. Cl.
　　　CPC ............. *G21C 13/02* (2013.01); *G21C 15/16* (2013.01); *B01F 3/04* (2013.01); *Y02E 30/40* (2013.01)

(56) References Cited

U.S. PATENT DOCUMENTS

| | | |
|---|---|---|
| 3,550,721 A | 12/1970 | Bruner |
| 3,635,404 A | 1/1972 | Hopkins et al. |
| 4,104,002 A | 8/1978 | Ehrich |
| 5,082,620 A | 1/1992 | Fennern |
| 5,353,319 A | 10/1994 | Challberg |
| 5,699,983 A | 12/1997 | Ellsworth |
| 7,835,483 B2 | 11/2010 | Chaki et al. |
| 8,345,817 B2 | 1/2013 | Ishida et al. |
| 2003/0118144 A1 | 6/2003 | Erbes et al. |
| 2013/0251085 A1 | 9/2013 | Bergman |
| 2013/0301790 A1* | 11/2013 | Fortino .................. G21C 15/25 376/392 |
| 2015/0092905 A1 | 4/2015 | Lemm et al. |

FOREIGN PATENT DOCUMENTS

| | | |
|---|---|---|
| KR | 101501463 | 3/2015 |
| KR | 20160146131 | 12/2016 |

OTHER PUBLICATIONS

WIPO, International Search Report in Corresponding PCT Application PCT/US2018/022094, dated Oct. 10, 2019.
WIPO, Written Opinion in Corresponding PCT Application PCT/US2018/022094, dated Oct. 10, 2019.

* cited by examiner

INTERMIXING FEEDWATER SPARGER NOZZLES AND METHODS FOR USING THE SAME IN NUCLEAR REACTORS

BACKGROUND

Figure 1:
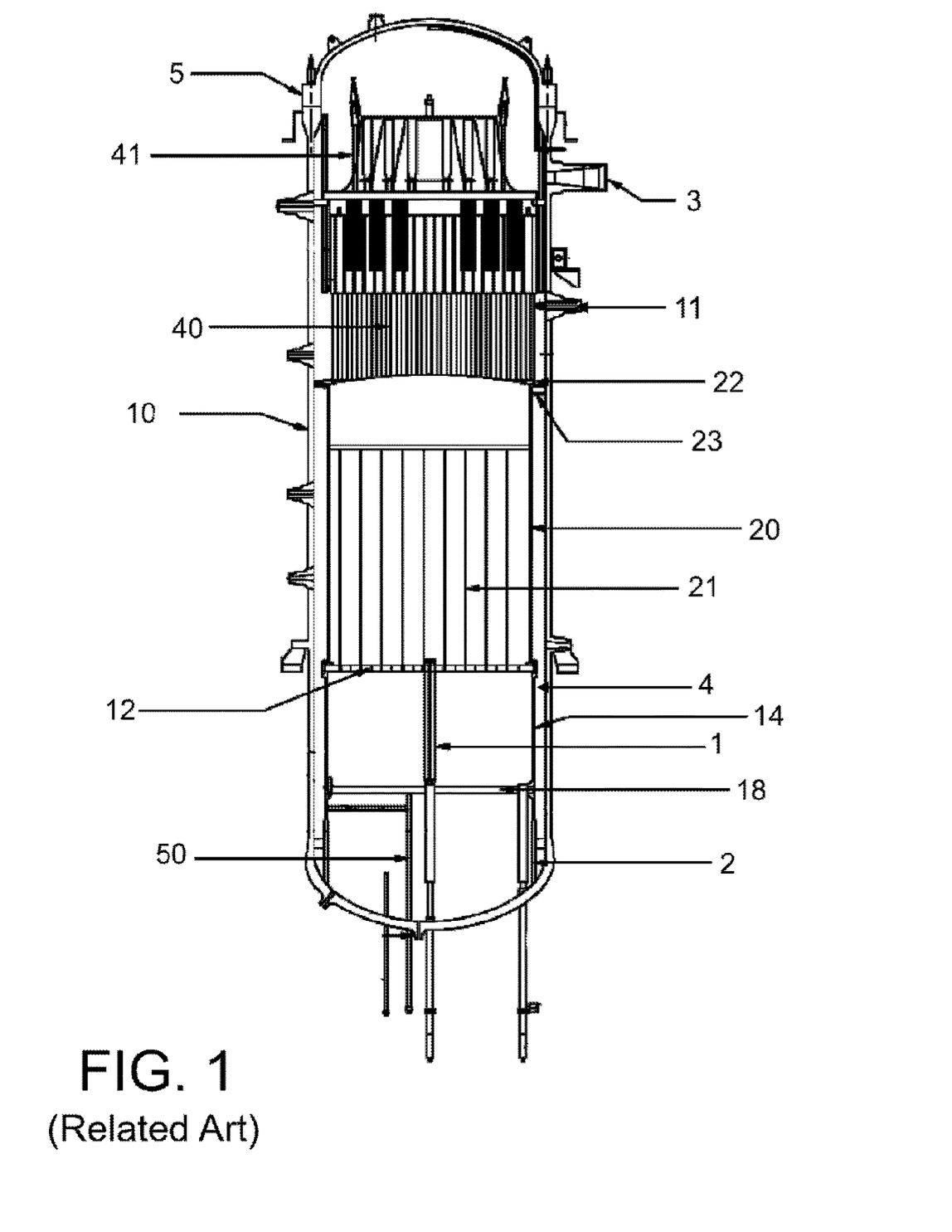
FIG. 1 is an illustration of a related art nuclear power vessel and internals.

FIG. 1 is cutaway view of a related art reactor pressure vessel 10, such as an ESBWR pressure vessel. Vessel 10 includes a core plate 18 laterally supporting one or more fuel assemblies 1 within core shroud 14. Core shroud 14 separates upward flow of coolant through the core and assemblies 1 therein from downward flow in downcomer annulus 4. Core plate 18 further supports core shroud 14 and may itself be supported by support ring and legs 2. Top guide 12 is positioned at a top of the core shroud 14 and potentially bolted to core shroud 14. Top guide 12 may be a grid structure that provides lateral support and positioning to the top of fuel assemblies 1. Each opening in top guide 12 can provide lateral support and guidance for four fuel assemblies 1 (or in the case of peripheral openings at the edge of the core, two or three fuel assemblies). One or more instrumentation tubes 50 and control rod drives may extend through a bottom of vessel 10 for control and monitoring of the conditions in the core.

As liquid coolant boils among assemblies 1, a heated mixture of steam and water flows upward through top guide 12. Chimney 20 receives the energetic steam/water mixture exiting fuel assemblies 1, which flows through partitions 21 in chimney 20 to limit cross flow and minimize potential for recirculating eddies in this heated coolant moving up through reactor 10. Chimney 20 supports steam separators 40 at an opposite end via chimney head 22 laterally supported by chimney restraint 23. After exiting chimney 20, the steam/water mixture is directed into steam separators 40 that separate liquid water from the steam-water mixture rising therethrough. Steam from the steam separators 40 flows upward to steam dryers 41, where additional moisture is removed. The separated and removed liquid is directed into downcomer annulus 4 between the outer wall of chimney 20 and inner wall of vessel 10. The dried steam exiting steam dryers 41 is then directed into main steam lines 3 for electrical power production.

Figure 2A:
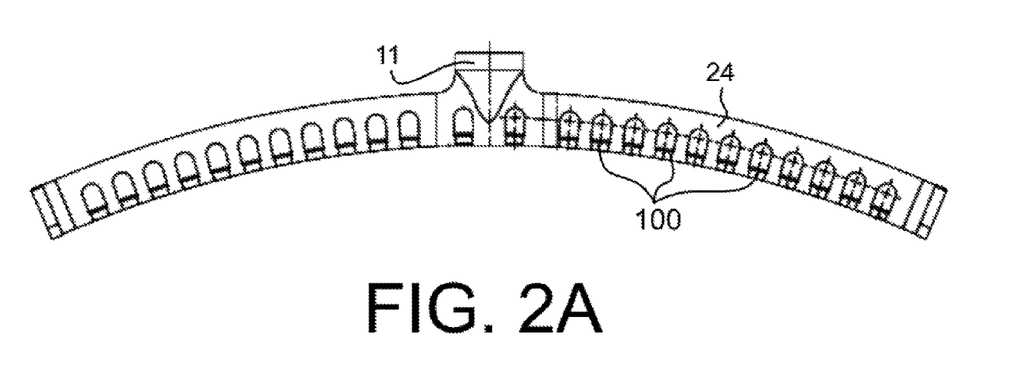
FIG. 2A is a top view of a schematic of a feedwater sparger assembly.
Figure 2B:
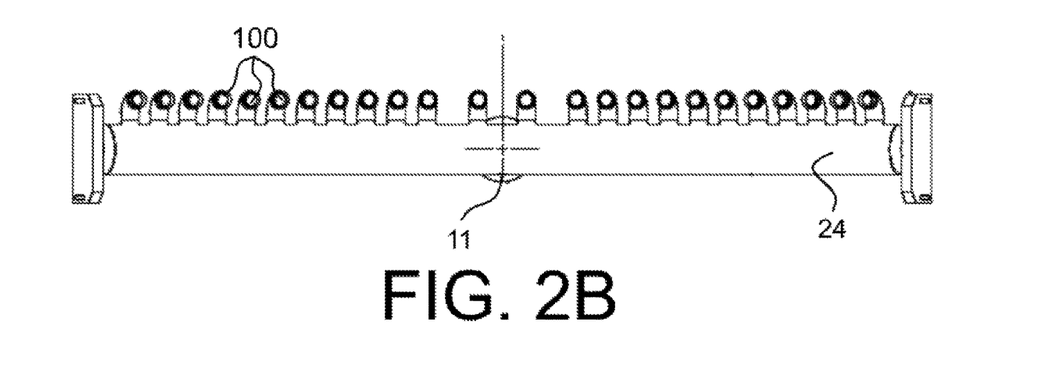
FIG. 2B is a front view of the schematic of the feedwater sparger assembly of FIG. 2A.

New makeup feedwater is received from main feedwater line 11 flowing into downcomer annulus 4. The feedwater is typically heated, but still cooler than liquid water redirected from dryers 41 and steam separators 40 in downcomer annulus 4. For example, incoming feedwater from line 11 may be up to 100 or more degrees Fahrenheit cooler than temperature of water, operating near a boiling temperature, when flowing from dryers 41 and steam separators 40 into downcomer annulus 4 for recirculation through the reactor. To evenly distribute feedwater from line 11, a distribution system may be used in annulus 4 to evenly distribute new feedwater flow. FIGS. 2A and 2B are top and front views of related art feedwater sparger assemblies 24 useable to so distribute new feedwater flow. As seen in FIGS. 2A and 2B, sparger assembly 24 connects to main feedwater line 11 and distributes the water across an annular space.

SUMMARY

Example embodiments include nozzles useable to mix fluids like nuclear reactor coolant. Example embodiment nozzles include multiple flow paths from different fluid sources that flow together in a diffuser or nozzle outlet for well-mixed output. The different fluid sources may be separately located and provide fluids of differing characteristics, such as a feedwater source remote to the nozzle and a downcomer annulus source in which the nozzle is immersed. Several different flow path configurations may be used, including a 4-path configuration with an inner path and outer path concentrically drawing fluid from a first source, and a top path and an annular path drawing fluid from a second source. Swirl vanes may be present in one or more of the flow paths and/or the diffuser section, potentially the entire length of example embodiment nozzles, to impart mixing and filtering to the fluid flow. One or more diffusers may be shaped to suction or accelerate flow and mixing from the multiple fluid sources. Example nozzles may have flow paths of a single, integrated design without material interruption between components and/or may be manufactures through additive manufacturing methods with individual components, channels, and flow paths being incrementally built-up from one-another.

Example embodiment nozzles may include filter systems that can be selectively disengaged and avoided if nonfunctional or clogged. For example, the bypassable filter system can include trap filters that capture debris based on a momentum difference between the denser debris and fluid without blocking fluid flow. Example filters include includes magnetic, adhesive, or porous materials on a perimeter of the diffuser that capture debris centrifugally forced outward toward the material as well as momentum filters having debris traps at sharp turns or redirections in flow paths to catch debris that cannot make the turn. Example filters may be integrated with the diffuser, but upon selective disengagement, such as at a threshold pressure associated with clogging, a new flow path around the bypassable filter system may be created.

Example nozzles are useable in conjunction with a feedwater manifold or sparger assembly that distributes feedwater to multiple nozzles. For example, inlet feedwater may be used as a first source for various nozzle flow conduits, while water from a steam separator and/or dryer flowing into a downcomer annulus may be used for a second source. Nozzles may be varied in terms of flow area or angle of attack with distance from a feedwater intake in the manifold, so as to evenly distribute flow from the sparger assembly.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Because this is a patent document, general broad rules of construction should be applied when reading and understanding it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a," "an," and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

The Inventors have recognized that different streams of feedwater and steam separator/dryer water in a nuclear reactor may poorly mix prior to flowing through a reactor core. This inadequate mixing may result in distinct streams of water having different temperature and/or chemical properties. As reactor components, such as downcomer walls formed by a core shroud or chimney wall, are exposed to differing coolant streams, they may undergo cycling and wear, such as thermal stress and fatigue from being constantly cooled and warmed at different locations. Moreover, if coolant/moderator of differing properties passes through a reactor core, reactor neutronics may vary greatly in different bundles, resulting in core instability and inefficiency. As such, the Inventors have recognized a need for adequate mixing and consistency of properties in coolant throughout a nuclear reactor, preferably as soon as any new feedwater is introduced.

The Inventors have further recognized that filtration of reactor water is desired at all reactor locations, not just in a reactor core where fretting due to debris-fuel interactions occur. Filters, however, must not impede feedwater flow or cause significant pressure drop as they retain debris from the water. As such, the Inventors have recognized a need for additional reactor coolant filtering in a way that does not impact overall core coolant flow. Example embodiments described below address these and other problems recognized by the Inventors with unique solutions enabled by example embodiments.

The present invention is mixing nozzles, feedwater sparger assemblies using mixing nozzles, and methods of using all of the same. In contrast to the present invention, the small number of example embodiments and example methods discussed below illustrate just a subset of the variety of different configurations that can be used as and/or in connection with the present invention.

FIG. 2A is an illustration of related art feedwater sparger assembly 24 using multiple example embodiment sparger nozzles 100 as outlets for distributed feedwater from feedwater line 11 above or in a downcomer annulus of a nuclear reactor, such as annulus 4 (FIG. 1). FIG. 2B is a front or transverse view of related art assembly 24. As seen in FIGS. 2A and 2B, assembly 24 may be arced or semi-circular to fit within an annular space at a feedwater line. Multiple assemblies 24 may be used to cover an entire annulus and/or assembly 24 may extend greater or lesser degrees above or throughout a downcomer annulus. As suggested by a top view in FIG. 2A, assembly 24 may extend in an angular direction about a circumference of a downcomer, while example embodiment nozzles 100 may open at a 90-degree angle in a radial direction. A single sparger assembly 24 may accommodate multiple outlets and/or nozzles 100, permitting liquid coolant from main feedwater line 11 to be distributed throughout a downcomer annulus and thus evenly supplied up into a reactor core at a bottom on the annulus.

Figure 3:
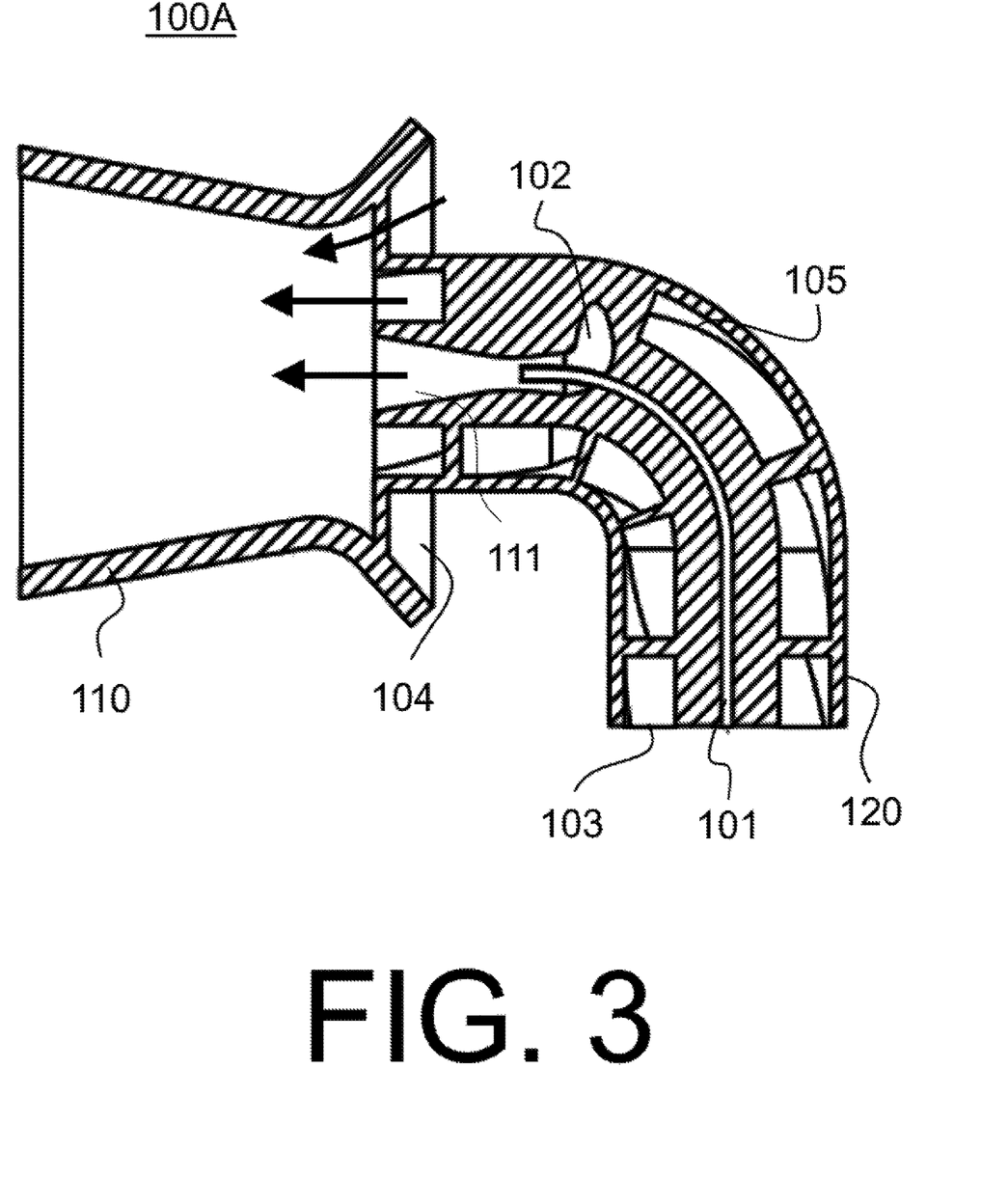
FIG. 3 is a profile cross-sectional schematic of an example embodiment sparger nozzle.

FIG. 3 is a profile cross-sectional schematic of an example embodiment sparger nozzle 100A useable as nozzle(s) 100 in FIGS. 2A and 2B, as seen in a radial plane. That is, upon installation, example embodiment nozzle 100A as oriented in FIG. 3 may face a core shroud or other inner surface of a downcomer annulus or other space, while the sparger assembly may extend into the page. As seen in FIG. 3, example embodiment sparger nozzle 100A collects several distinct flows in a diffuser 110. These flows are from various sources and have different flow characteristics, chemistries, and/or temperature, and nozzle 100A enhances mixing of those flows for a flow of averaged conditions.

Figure 4:
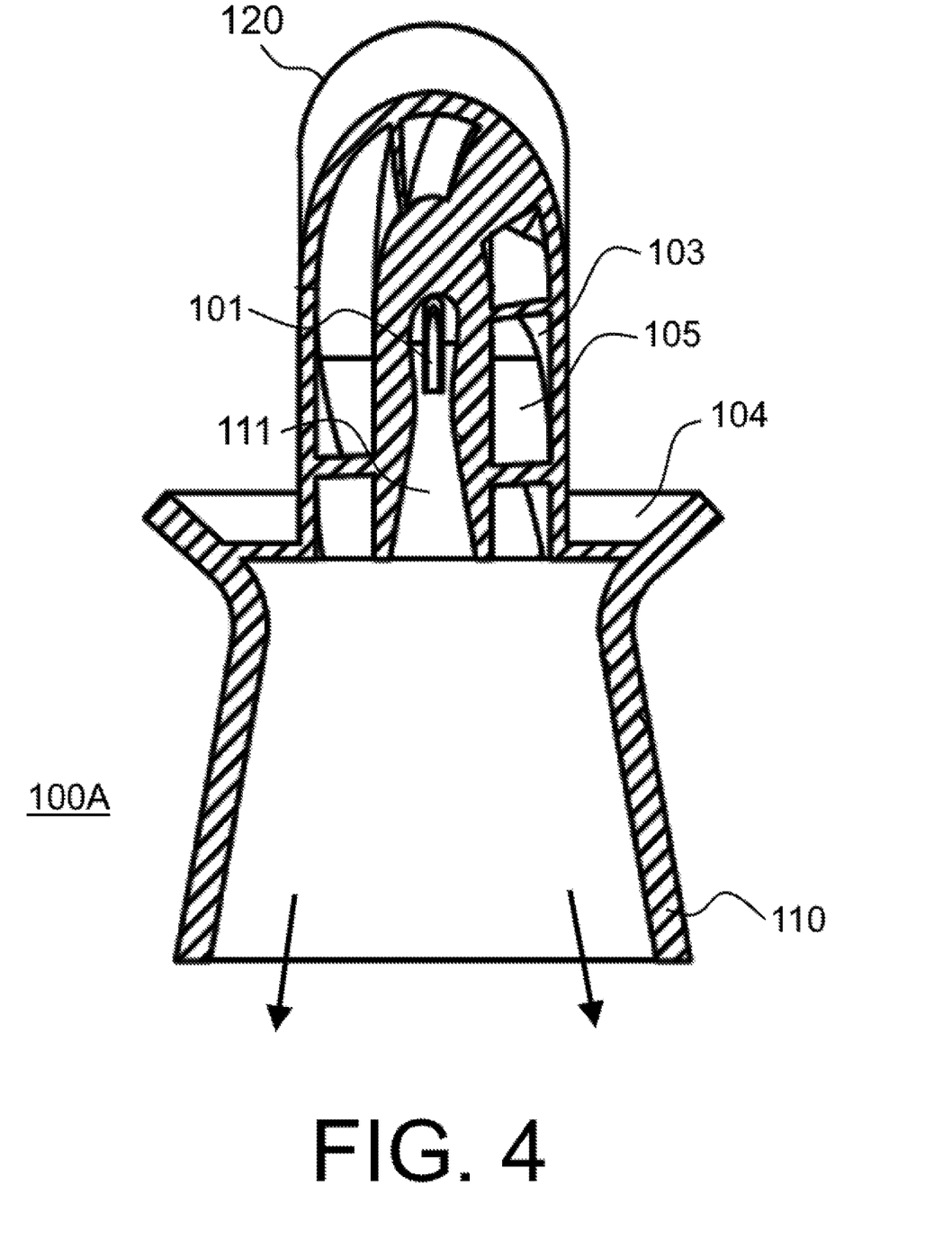
FIG. 4 is a top cross-sectional schematic of the example embodiment sparger nozzle of FIG. 3.

For example, as shown in FIGS. 3 and 4, four different fluid paths may be mixed in example embodiment nozzle 100A, such as in diffuser 110 or elsewhere. Central conduit 101 may carry water from a source, such as a sparger assembly or other manifold receiving relatively cold and/or low energy feedwater, up through nozzle conduit 120 that connects nozzle 100A to a sparger assembly. Central conduit 101 may have a smaller flow area to increase fluid velocity through conduit 101, creating a jet pump effect through diffuser 110 and/or pre-diffuser 111. Central conduit 101 flows into a pre-diffuser 111 that is formed from a top flow conduit 102. Top flow conduit 102 may be a pipe or tube that penetrates up through nozzle conduit 120. Top conduit 102 may catch and redirect vertical flow, such as recycled, hot liquid coming off a steam dryer and/or steam separator and down to a downcomer. By a jet pump effect in pre-diffuser 111, the central, faster flow from central conduit 101 sucks hotter liquid flow from top conduit 102 into pre-diffuser 111 where the two flows mix.

Outer conduit 103 similarly carries liquid water from the source of the central conduit 101 through nozzle conduit 120. Outer conduit 103 may be larger than central conduit 101 and carry a large volume of cooler feedwater. Swirl vanes 105 may form a spiral or twisted pattern inside outer conduit 103, imparting angular momentum to a fluid flow therein and enhancing its mixing and expansion into diffuser 110 by increasing shear surface area of the water flow. Rotation or swirl imparted by swirl vanes 105 also reduce flow-induced vibration. An outer venturi annulus 104 may gather liquid water from a same source as top conduit 102, such as relatively hotter water flowing into a downcomer. The larger, outer flow from outer conduit 103 may suction liquid into venturi annulus 104, where it mixes in diffuser 110.

All flows intermix in diffuser 110, which may impart a jet pump effect on lower-energy flows. The sandwiching of flows from conduits 101, 102, 103, and 104 enhances mixture and heat transfer in diffuser 110. Diffuser 110 may further include swirl vanes (not shown) to further aid in mixing the flows by increasing shear surface area of the fluid flows. Any rotation or turbulence in the flows, such as swirling imparted by swirl vanes 105 in a larger flow from outer conduit 103, may yet further enhance mixing and expulsion of the mixed flows from diffuser 110. Diffuser 110 may flow into surrounding fluid as shown by arrows in FIGS. 3 and 4, potentially at an angle to surrounding flow in a downcomer annulus. This flow from example embodiment nozzle 100A may thus be well-mixed and evenly distributed among several example embodiment nozzles 100A. As such, example embodiment nozzle 100A enhances feedwater and return water intermixing and averaging of energies and chemistries, reducing temperature gradients or separate cold/hot streams flowing in a downcomer annulus and into a reactor core.

The Inventors have modelled example embodiment nozzle 100A and a plain, open pipe dispensing identically disparate feedwater flow and heated water sources simulating temperatures and conditions in an ESBWR downcomer annulus. The flow from example embodiment nozzle 100A creates a much flatter temperature gradient and shows general averaging of temperature with surrounding water tank temperature much faster (several feet less) than flow from an open pipe. Further, a cold central "plume" of unmixed feedwater is created from the open pipe and persists for nearly a foot of flow, whereas flow from example embodiment nozzle 100A lacks any such central plume and is overall mixed much faster.

Figure 5:
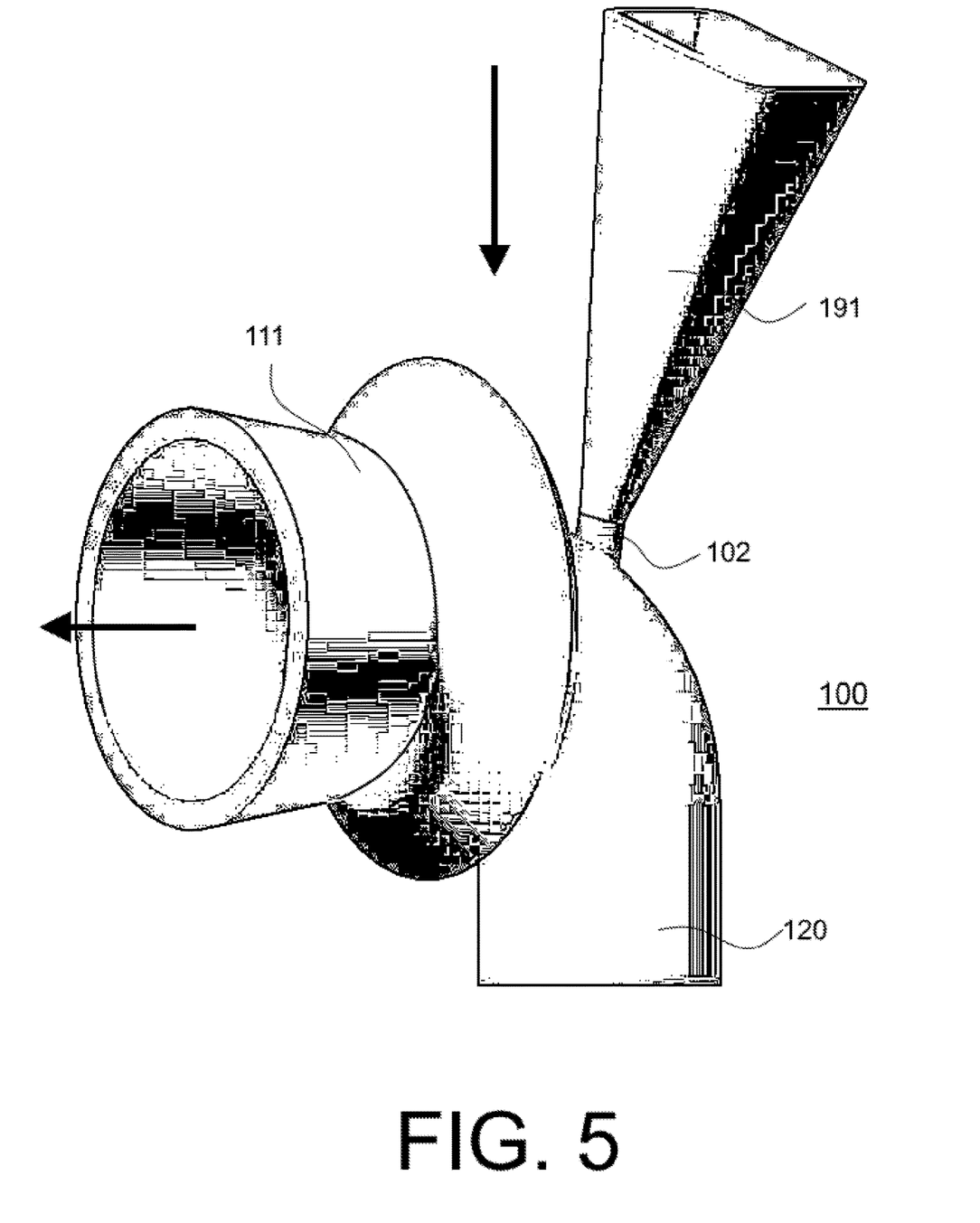
FIG. 5 is a perspective view of an exterior of an example embodiment sparger nozzle.

FIG. 5 is an illustration of an example embodiment sparger nozzle 100 showing an exterior of nozzle 100. As shown in FIG. 5, top conduit 102 may extend to an exterior of nozzle conduit 120 to reach and redirect flow shown by the downward arrow. Collection funnel 191 may be attached to top conduit 102 to gather even more fluid as well as accelerate the same into top conduit 102. A weep hole or steam separator (not shown) may be used with collection funnel 191 to remove any two-phase flow and ensure only liquid water is flowed through example embodiment nozzle 100. Still further, a weep hole or steam separator (not shown) may be used in an interior of nozzle 100 to reduce two-phase flow and allow any gasses or voids to escape from blocking or impeding liquid mixture.

As shown in FIGS. 2A and 2B, multiple example embodiment nozzles 100 may be used on sparger assembly 24. These nozzles 100 may all be identical to example embodiment nozzles 100A or sparger nozzles 100 may also be varied. Multiple, simple elbows may be connected to a top of a pipe having a bend radius similar to those in reactor vessel 10 (FIG. 1). Inlet nozzles 100 may be thus connected to colder feedwater for feed into the reactor vessel. Sparger nozzles 100 may also be varied, for example, by nozzles 100 closer to main feedwater line 11 being smaller or having relatively less flow area, while nozzles 100 toward ends of assembly 24, away from line 11, may be larger or have more flow area. This may permit even distribution of liquid feedwater from sparger assembly 24 by providing more flow path where pressure may be lower in feedwater due to losses. Still further, nozzles 100 may all be oriented in a radial direction that is orthogonal to annular downcomer flow, or nozzles 100 may be set at different and distinct angles, such as 30-degrees off of orthogonal in either direction. Several different designs of nozzles 100 may also be used, in addition or alternative to example embodiment nozzle 100A. As such, example embodiment nozzles 100 or 100A are all useable with existing feedwater annuluses and/or in new feedwater inlets.

Figure 6:
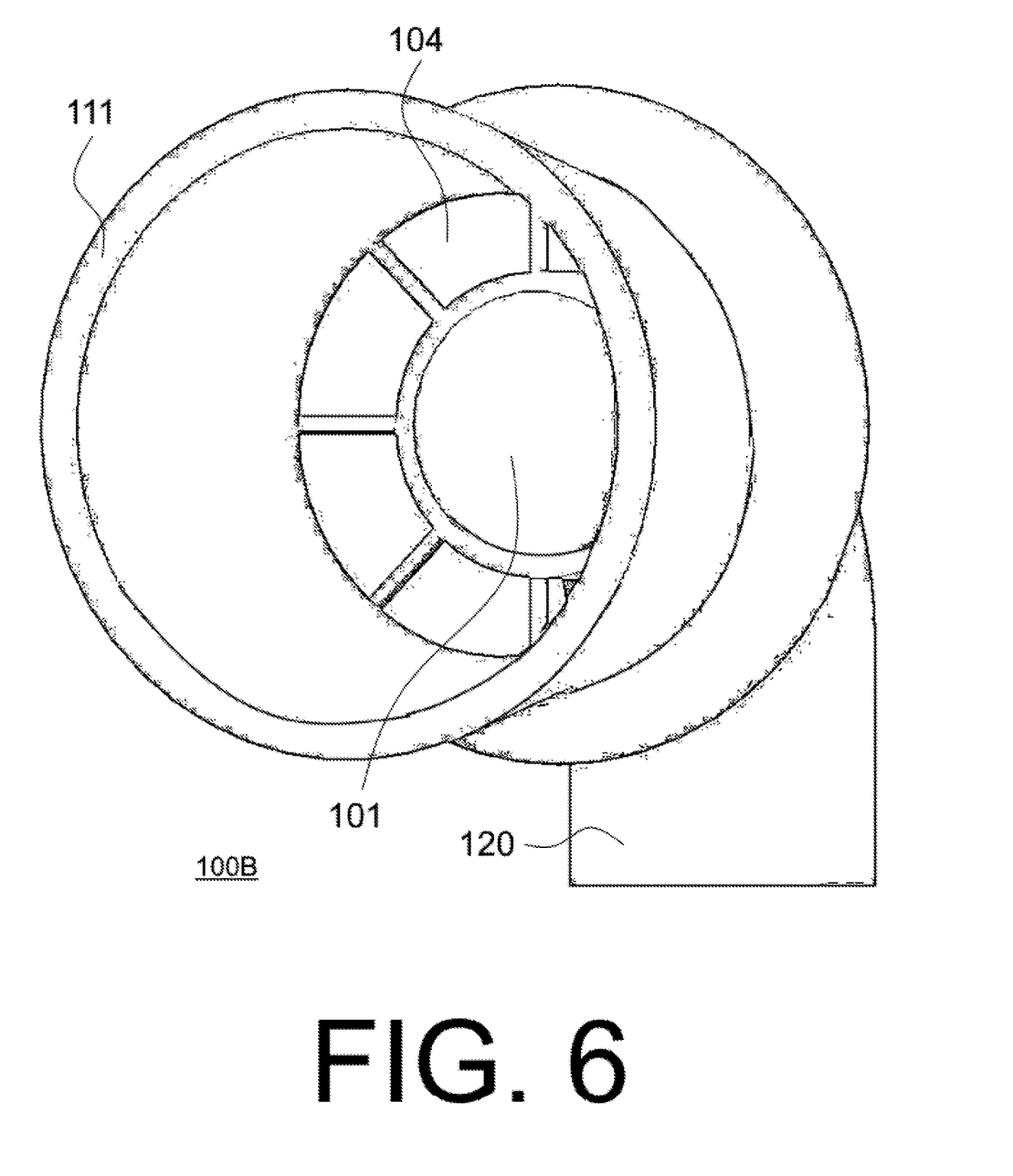
FIG. 6 is a perspective view of another example embodiment sparger nozzle.

For example, as shown in FIG. 6, a different example embodiment sparger nozzle 100B is useable as nozzle 100 in FIGS. 2A & 2B. As seen in FIG. 6, example embodiment nozzle 100B includes only an enlarged central conduit 101 and outer venturi annulus 104 without swirl vanes—that is, one central colder feedwater conduit and one outer hotter recirculated water conduit. The enlarged flow area for feedwater from central conduit 101 may cause fewer losses and/or present a larger flow path into diffuser 111. Because of the lower losses and greater flow area, example embodiment nozzle 100B may be used at positions farther from main feedwater line 11 in sparger assembly 24 (FIGS. 2A and 2B) to even flow from all example embodiment nozzles 100.

Figure 7:
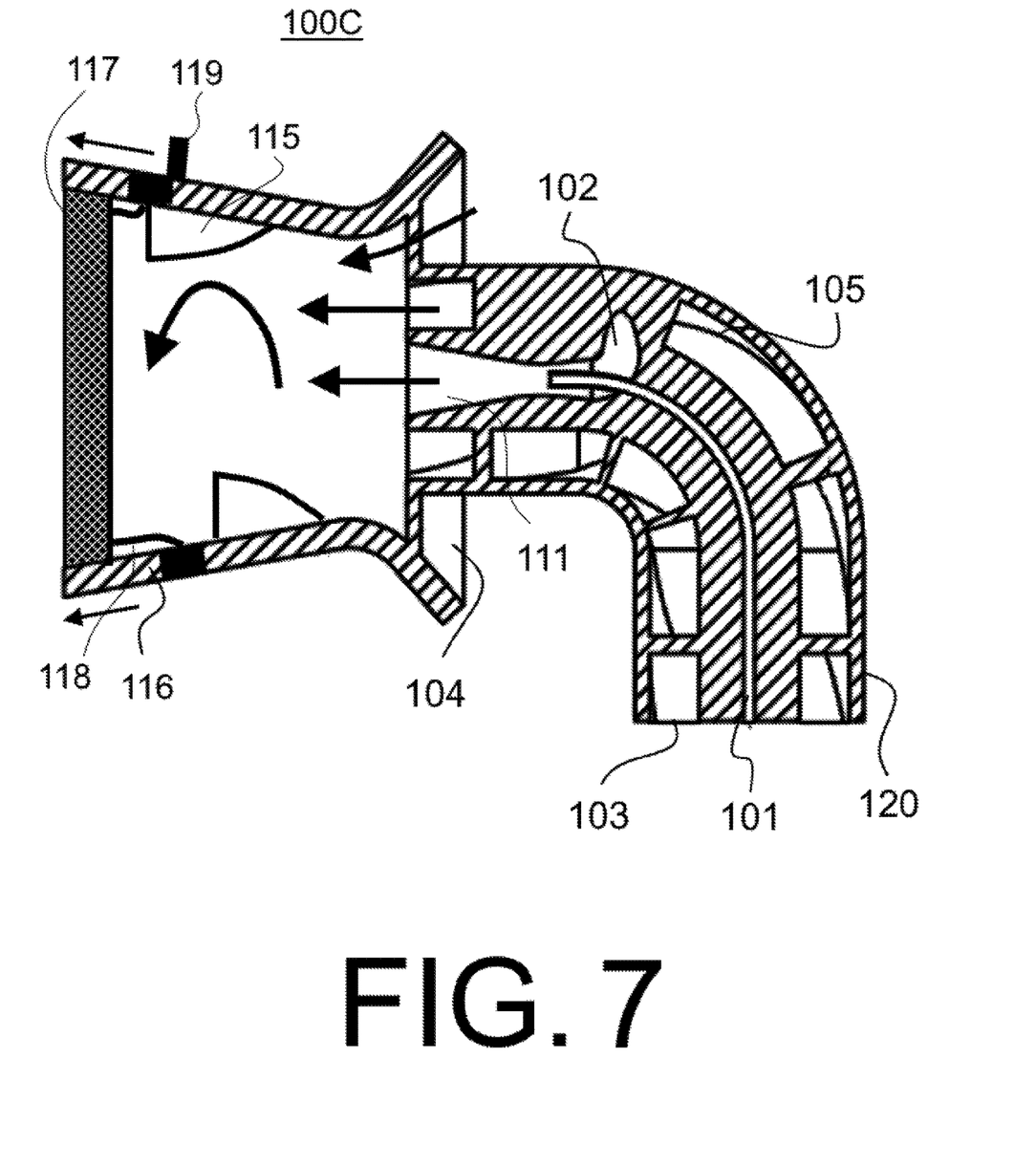
FIG. 7 is a profile cross-sectional schematic of an example embodiment sparger nozzle.

FIG. 7 is an illustration of yet another example embodiment sparger nozzle 100C, which may be similar to example embodiment nozzle 100A, except with filter diffuser 116 instead of diffuser 110. As shown in FIG. 7, example embodiment nozzle 100C includes a filter diffuser 116 having several filtering elements 117 and 118 about an exit. Filter diffuser 116 further includes a bypass 119 that permits fluid to flow around the filtering elements should they become clogged or cause an undesirable pressure drop. For example, bypass 119 may be a lift-off mechanism that causes an end of filter diffuser 116 to detach and extend outward (as shown by arrows), such that fluid from conduits 101, 102, 103, and 104 will flow through an annular gap caused by the lift off mechanism and avoid the filtering elements. Similarly, bypass 119 may be a hinge with release that permits the end to rotate down out of the flow path and/or a release valve that creates a new flow path for fluid out of filter diffuser 116 without passing through filtering elements. Bypass 119 may be a spring, actuator, and/or release latch, for example, that releases the end with the filtering elements at a threshold force associated with filter blockage. Of course, no bypass 119 may be used in example embodiments, or bypass 119 with a very high backpressure threshold may be used, and fluid flow may be diverted back out of conduits 104 or even 102 in the instance of filter clogging with sufficient pressure relative to surrounding flow.

As seen in FIG. 7, filtering elements may include a diverting filter 117 and/or a centrifugal filter 118 with flow vanes 115. Centrifugal filter 118 may be an annular magnet or magnetic tiles, a porous and/or adhesive media created from laser sintering interior surfaces of diffuser 116, and/or any other debris-trapping barrier. As flow vanes 115, potentially in combination with vanes 105 in conduit 103, impart swirl to the combines fluid flows through filtering diffuser 116, heavier/denser debris, such as metallic particles and filaments common in nuclear reactor internals, will move radially outward in the flow due to increased mass without additional centripetal acceleration. As the debris is pushed outward in the swirling fluid flow, it will come close to or into contact with centrifugal filter 118, which may entrap the debris through magnetic attraction, physical entanglement, and/or chemical adhesion. The debris may thus be retained in or on filter 118 at outer edge of diffuser 116 through a centrifuge effect, while fluid is able to flow centrally through the same.

Diverting filter 117 may extend across an entire flow path or exit of diffuser 116, filtering all liquid passing through diffuser 116. Or diverting filter 117 may be placed in individual flow paths 103 and/or 101 at an entry of example embodiment nozzle 100C. For example, through additive manufacturing, a porous or mesh filter 117 may be present in a base of flow paths 103 and 101. In the instance of blockage or other non-functionality of filter 117 placed lower near an origin of paths 103 and 101, bypass 119 may lift off an entirety of nozzle 100C, allowing feedwater to flow directly from a source into surrounding flow and bypass filter 100C.

Figure 8A:
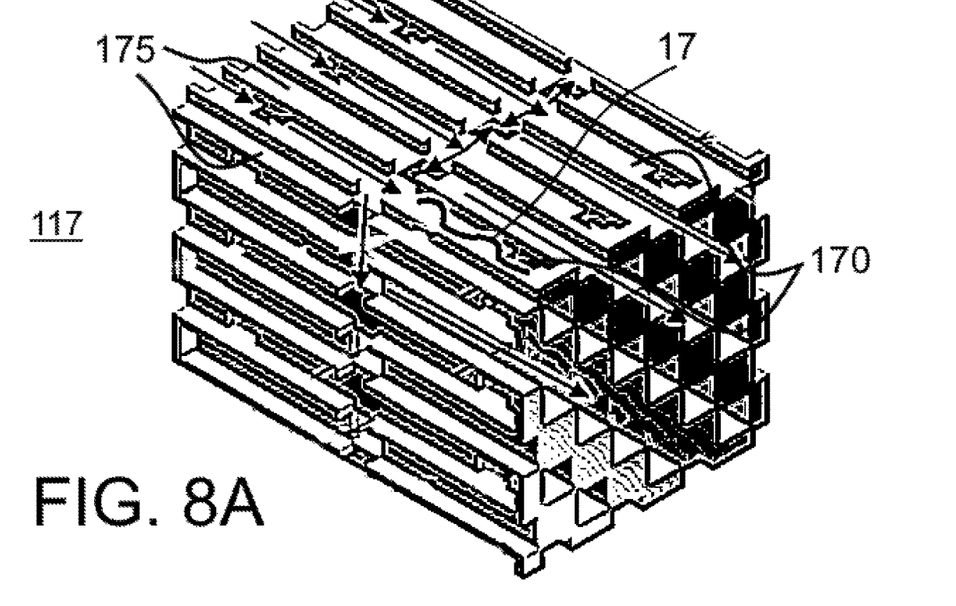
FIG. 8A is a perspective illustration of a section of an example embodiment sparger nozzle filter.

Diverting filter 117 may be any type of filter, including a mesh or screen or organic matrix. Or diverting filter 117 may be a momentum trap filter 117 shown in FIGS. 8A and 8B. As seen in FIG. 8A, momentum trap filter 117 may include several stepped or crenulated plates creating circuitous, but open and large, flow paths 175 that extend in multiple dimensions. For example, flow paths 175 may run a long distance at one level and then divert vertically a short distance and continue the run.

Figure 8B:
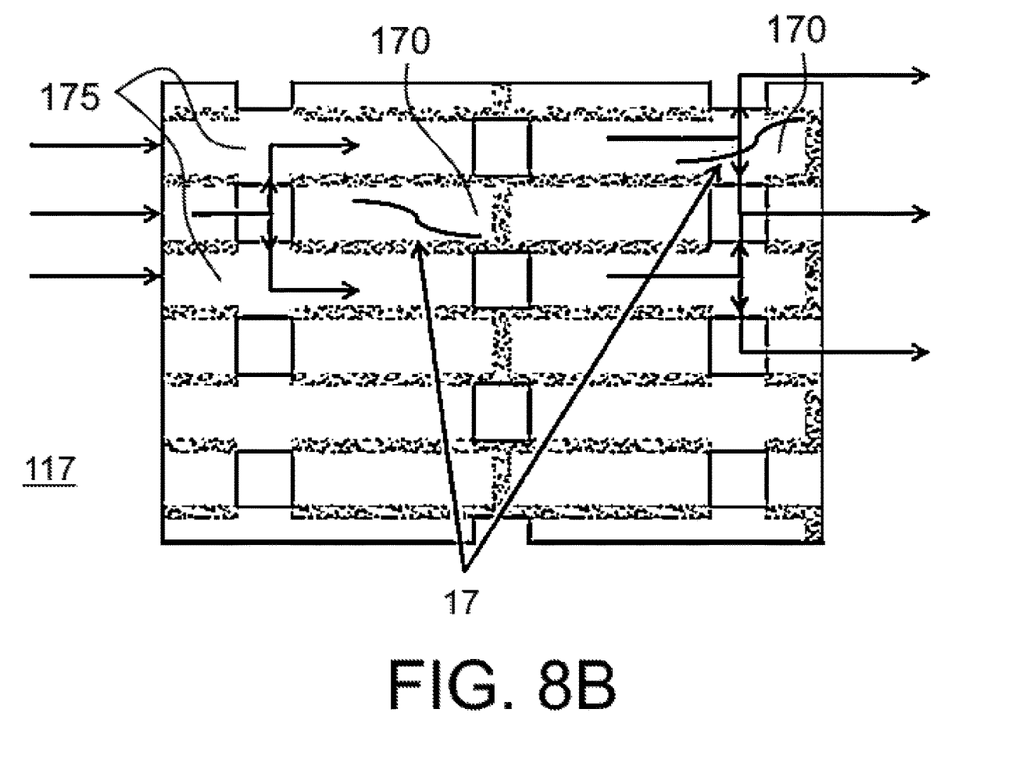
FIG. 8B is a profile schematic of a cross-section of the example embodiment sparger nozzle filter of FIG. 8A.

As seen in the profile section of FIG. 8B, momentum built after a longer run in flow path 175 may be used to trap debris 17 in a route trap 170 at the end of the long run. Because debris 17 is more massive/dense than the fluid flowing through paths 175, at a sudden change in direction and/or level in filter 117, debris 17 may have too much momentum and instead pass into trap 170 instead of moving in the bend with the fluid through the circuit of flow path 175. Momentum traps 170 may include magnetic, porous, and/or adhesive materials that further entrap debris 17 passing into trap 170 and prevent its withdrawal back out into open flow path 175. In this way, fluid may relatively easily pass through open flow paths 175 and out of filter 117, while more massive debris is caught in traps 170 without blocking open flow paths 175.

Centrifugal filter 118 and/or diverting filter 117 may be cleaned during maintenance intervals and or modularly replaced through actuation of bypass 119 and/or removal of example embodiment nozzle 100C. Although centrifugal filter 118 and momentum filter 117 may capture and hold debris without significantly blocking fluid flow or causing pressure drop through example embodiment nozzle 100C, in the instance that any filter does become clogged or inoperable (such as when encountering volumetrically large debris or failure conditions), bypass 119 may actuate and allow fluid to flow directly into a downcomer annulus without blockage by inoperable filters. Such a bypass may also be reset during maintenance intervals when filters are cleaned and/or replaced.

Example embodiment sparger nozzles 100 may be fabricated of resilient materials that are compatible with a nuclear reactor environment without substantially changing in physical properties, such as becoming substantially radioactive, melting, brittling, or retaining/adsorbing radioactive particulates. For example, several known structural materials, including austenitic stainless steels 304 or 316, XM-19, zirconium alloys, nickel alloys, Alloy 600, etc. may be chosen for any element of components of example embodiment nozzles 100. Joining structures and directly-touching elements may be chosen of different and compatible materials to prevent fouling. Example embodiment sparger nozzles 100 may be fabricated as a single part, such as through casting and/or molding, reducing complexity and potential for individual components, such as swirl vanes or conduits, to become detached or loose. Still further, example embodiment sparger nozzles 100 may be manufactured through additive manufacturing, by building up each component successively from a simplest, central component and welding additional, outer components to the same.

As shown in FIGS. 2A and 2B, example embodiment sparger nozzles 100 may be installed on an assembly 24 in a downcomer annulus or otherwise during a maintenance outage or during plant fabrication. That is, example embodiment nozzles 100 may function as retrofits in existing reactors such as BWRs as well as new nozzles in newly-commissioned plants such as the ESBWR. Example embodiment nozzles may be relatively easily installed by a juncture of nozzle conduit 120 with assembly 24 through existing joining structures such as a bayonet fitting, Swagelok fittings, tangs, screws, and/or weld points. Such joining structures may also facilitate easy removal/inspection or example embodiment nozzles 100 and/or cleaning and filter replacement in the same. As discussed above, multiple different example embodiment nozzles 100 may be used in a single assembly 24, such as with varying designs between nozzles 100A, 100B, 100C, and/or otherwise, at different positions and flow angles, based on anticipated reactor conditions.

Example embodiments and methods thus being described, it will be appreciated by one skilled in the art that example embodiments may be varied and substituted through routine experimentation while still falling within the scope of the following claims. For example, although example embodiments are discussed in usage with purified water found in boiling-type reactors, a variety of different plant types, core configurations, and fluid coolants are compatible with example embodiments and methods simply through proper dimensioning and material selection of example embodiments—and fall within the scope of the claims. Such variations are not to be regarded as departure from the scope of these claims.

What is claimed is:
1. A feedwater nozzle useable in a nuclear reactor, the nozzle comprising:

a plurality of flow conduits originating at distinct coolant sources, wherein at least one of the coolant sources is feedwater for the nuclear reactor;

a diffuser combining the plurality of flow conduits in the diffuser; and a bypassable filter system attached to the diffuser.

2. The nozzle of claim 1, wherein at least one of the flow conduits connects to a coolant source remote from the diffuser, and wherein at least one of the flow conduits connects to a coolant source surrounding the diffuser.

3. The nozzle of claim 1, wherein the plurality of flow conduits include, an inner central conduit originating at a first coolant source, a top flow conduit originating at a second coolant source, an outer central conduit surrounding the inner central conduit and originating at the first coolant source, and an annular opening in the diffuser originating at the second coolant source.

4. The nozzle of claim 3, wherein the outer central conduit includes at least one swirl vane configured to swirl coolant flowing through the outer central conduit.

5. The nozzle of claim 3, wherein the inner central conduit opens into a pre-diffuser at its terminal, and wherein the top flow conduit terminates in the pre-diffuser.

6. The nozzle of claim 3, wherein the inner central conduit, the top flow conduit, the outer central conduit, and the annular opening are concentric with each other at a terminal in the diffuser.

7. The nozzle of claim 1, wherein the bypassable filter system includes at least one of a momentum filter extending across an entire opening of the diffuser and a centrifugal filter lining a perimeter of the diffuser.

8. The nozzle of claim 7, wherein the centrifugal filter includes magnetic material lining the perimeter of the diffuser, and wherein the diffuser includes at least one swirl vane configured to swirl coolant passing through the diffuser so as to drive debris toward the magnetic material.

9. The nozzle of claim 7, wherein the momentum filter includes flow paths with debris traps in the flow paths at points of direction change in the flow paths.

10. The nozzle of claim 7, wherein the bypassable filter system is continuous with the diffuser such that coolant must pass through the bypassable filter system until a threshold pressure is reached, and wherein a new flow path around the bypassable filter system is configured to open at the threshold pressure.

11. The nozzle of claim 1, wherein the plurality of flow conduits are additively manufactured into the nozzle.

12. A sparger assembly for use in a nuclear reactor, the assembly comprising:

a feedwater inlet; and a plurality of sparger nozzles configured to receive feedwater, wherein each of the plurality of sparger nozzles includes, a plurality of flow conduits originating at distinct coolant sources, wherein at least one of the coolant sources is the feedwater, a diffuser combining the plurality of flow conduits in the diffuser, and a bypassable filter system attached to the diffuser.

13. The sparger assembly of claim 12, wherein the distinct coolant sources include the feedwater inlet and the downcomer annulus.

14. The sparger assembly of claim 12 wherein the plurality of flow conduits include, an inner central conduit originating at a first coolant source, a top flow conduit originating at a second coolant source, an outer central conduit surrounding the inner central conduit and originating at the first coolant source, and an annular opening in the diffuser originating at the second coolant source.

15. The sparger assembly of claim 12, wherein the bypassable filter system includes at least one of a momentum filter extending across an entire opening of the diffuser and a centrifugal filter lining a perimeter of the diffuser.

16. The sparger assembly of claim 15, wherein the centrifugal filter includes magnetic material lining the perimeter of the diffuser, and wherein the diffuser includes at least one swirl vane configured to swirl coolant passing through the diffuser so as to drive debris toward the magnetic material.

17. The sparger assembly of claim 15, wherein the momentum filter includes flow paths with debris traps in the flow paths at points of direction change in the flow paths.

18. The sparger assembly of claim 15, wherein the bypassable filter system is continuous with the diffuser such that coolant must pass through the bypassable filter system until a threshold pressure is reached, and wherein a new flow path around the bypassable filter system is configured to open at the threshold pressure.

* * * * *